F. F. HOFFMANN.
DIRECTION INDICATOR.
APPLICATION FILED APR. 3, 1917.
1,327,605.
Patented Jan. 6, 1920.
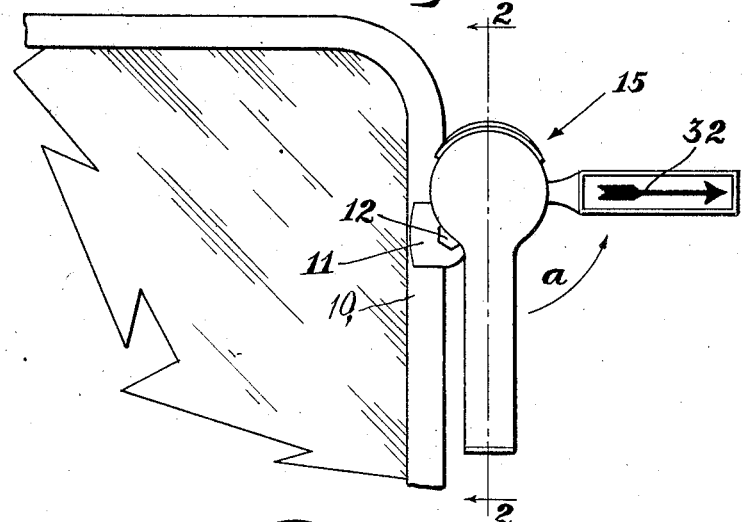
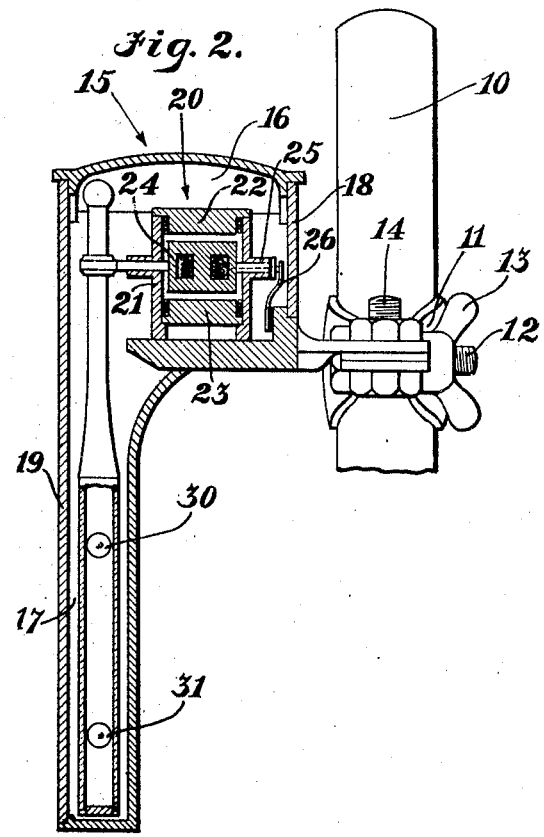
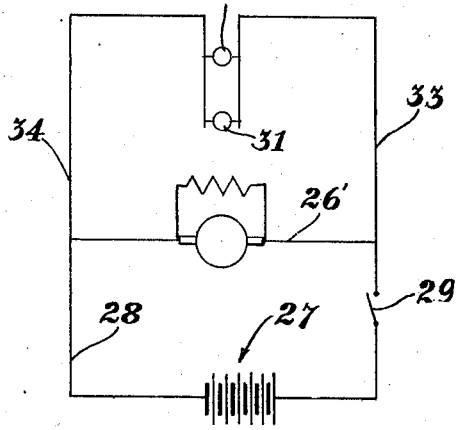
Inventor
Frank F. Hoffmann
by Hazard & Miller
Att'ys.

UNITED STATES PATENT OFFICE.

FRANK F. HOFFMANN, OF LOS ANGELES, CALIFORNIA.

DIRECTION-INDICATOR.

1,327,605.  Specification of Letters Patent.  Patented Jan. 6, 1920.

Application filed April 3, 1917. Serial No. 159,443.

*To all whom it may concern:*

Be it known that I, FRANK F. HOFFMANN, a citizen of the United States, residing at Los Angeles, in the county of Los Angeles and State of California, have invented new and useful Improvements in Direction-Indicators, of which the following is a specification.

My object is to simplify and improve the details of construction of a direction indicator adapted to be mounted upon the windshield of an automobile, and electrically operated by a switch.

Figure 1 is a fragmentary view of a windshield of an automobile disclosing it as fitted with a direction indicator with which the present invention is concerned.

Fig. 2 is a view in transverse vertical section as seen along the line 2—2 of Fig. 1, illustrating the detail construction of the indicating device and particularly disclosing means whereby it is electrically actuated.

Fig. 3 is a view in diagram illustrating the wiring of the semaphore actuating motor and the lights.

Referring more particularly to the drawings, 10 indicates the frame of a windshield, upon which a clamp 11 is detachably secured by means of a bolt 12 and a wing nut 13. The outer end of the clamp is fitted with a horizontal bearing plate having a vertically disposed stud bolt 14 upon which is mounted the supporting arm of a semaphore case 15 for horizontal movement. This case is formed with a motor housing 16 and a vertically extending semaphore arm housing 17 which extends downwardly from the motor housing. The back of the motor housing is provided with a removable plate 18 through which access to the motor may be gained. The front of the case is fitted with a plate 19 which normally conceals the semaphore. It will be understood that the outer side of the case is open in order to permit the semaphore to swing outwardly when actuated by the motor 20.

Reference being had to Fig. 2 of the drawings, it will be seen that the motor consists of an outer case 21, simple field wirings 22 and 23, and an armature 24. The armature is mounted upon bearings within the case and is fitted with a shaft which extends outwardly through the front of the case and upon which the semaphore is secured. The opposite trunnion of the armature extends rearwardly through a hub 25 at the back of the case and through which one of the electric conductors from the armature is led. This conductor is in constant contact with a brush 26 resiliently held at the end of the shaft. The brush is connected with a conductor 26' which leads to one pole of a source of electric energy 27. The other pole of the battery is connected with a conductor 28 and leads to the opposite side of the motor. A switch 29 controls this circuit and when this switch is closed the semaphore will be caused to swing upwardly and outwardly in the direction indicated by the arrow —*a*— in Fig. 1. The mechanical effort of the motor field will act to maintain this member in its horizontally raised position until the circuit is broken by opening the switch.

The semaphore is formed with a hollow arm within which incandescent lights 30 and 31 are positioned. The vertical sides of this arm are translucent and are preferably marked with a black arrow 32 which appears upon a red field. This will cause the semaphore to be readily visible, either in the daytime or at night. In order that the lights will be illuminated at the same time that the semaphore is raised, electric conductors 33 and 34 are shunted in upon the wiring arrangement of the motor and connected in parallel with the incandescent lights 30 and 31. This permits both the motor and the lamp circuits to be established simultaneously by means of the switch 29.

In operation, the direction indicator is mounted by means of the bracket 11 upon the side of the windshield of an automobile. It will be understood that the indicators are used in pairs, one to be placed upon one side of the vehicle and the other upon the opposite side in order that independent operation will advise the pedestrians of the intended direction of travel to be pursued by the driver of the vehicle. When it is desired to signal, the switch corresponding to the side toward which the vehicle turns, is closed. This will supply electric current to the motor and cause the semaphore arm to swing upwardly, as indicated in Fig. 1. Simultaneous with the action of the motor, a circuit will be established through the lamps and cause the translucent plates in the semaphore arm to be illuminated.

It will be seen that the direction indicator here disclosed may be easily installed upon the frame of a windshield and operated and illuminated to indicate the direction of travel of the vehicle.

While I have shown the preferred construction of my direction indicator as now known to me, it will be understood that various changes in the combination, construction and arrangement of parts may be made by those skilled in the art without departing from the spirit of my invention, as set up in the following claim:

I claim:

In a direction indicator, a clamp formed in two pieces adapted to fit the side frame of a wind shield, a bolt connecting the two pieces together, a horizontal bearing plate extending from one piece of the clamp, a stud bolt extending vertically from the horizontal bearing plate, a supporting arm resting upon the horizontal bearing plate with the stud bolt passing through the supporting arm, a nut upon the stud bolt to hold the supporting arm and bearing plate hingedly and adjustably together, a case extending from the supporting arm and adapted to form a motor housing extending upwardly from the supporting arm, and a semaphore arm housing extending downwardly from the motor housing.

In testimony whereof I have signed my name to this specification.

FRANK F. HOFFMANN.